(12) United States Patent
Bergquist et al.

(10) Patent No.: US 8,717,907 B2
(45) Date of Patent: May 6, 2014

(54) ADJUSTMENT OF RADIO DETECTION LEVEL FOR REQUEST SIGNALS BASED OBSERVED FALSE DETECTION

(75) Inventors: Gunnar Bergquist, Kista (SE); Tobias Tynderfeldt, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 831 days.

(21) Appl. No.: 12/863,025

(22) PCT Filed: Feb. 21, 2008

(86) PCT No.: PCT/SE2008/050201
§ 371 (c)(1),
(2), (4) Date: Jul. 15, 2010

(87) PCT Pub. No.: WO2009/105003
PCT Pub. Date: Aug. 27, 2009

(65) Prior Publication Data
US 2011/0110240 A1    May 12, 2011

(51) Int. Cl.
*G01R 31/08* (2006.01)
*G06F 11/00* (2006.01)
*G08C 15/00* (2006.01)
*H04J 1/16* (2006.01)
*H04L 1/00* (2006.01)

(52) U.S. Cl.
USPC ........ 370/241.1; 370/336; 370/310; 370/329; 370/331; 370/344; 455/432.3; 455/436; 455/450; 455/67.13; 455/500

(58) Field of Classification Search
None
See application file for complete search history.

(56) References Cited

U.S. PATENT DOCUMENTS

| 2003/0095517 A1 | 5/2003 | Proctor, Jr. |
| 2004/0247053 A1 | 12/2004 | Rached et al. |
| 2005/0164708 A1 | 7/2005 | Gabriel et al. |

(Continued)

FOREIGN PATENT DOCUMENTS

| WO | WO 2007/025970 | 3/2007 |
| WO | WO 2007/052971 | 5/2007 |
| WO | WO 2008/041916 | 4/2008 |

OTHER PUBLICATIONS

International Search Report for PCT/SE2008/050201, mailed Nov. 26, 2008.

(Continued)

*Primary Examiner* — Ian N Moore
*Assistant Examiner* — Eric H Wang
(74) *Attorney, Agent, or Firm* — Nixon & Vanderhye, P.C.

(57) ABSTRACT

The present invention relates to receiving access signals from a plurality of terminals over a radio channel and in particular to determining a detection threshold level on the radio channel. A detection threshold level should balance the risk of missed detections to the risk of false detections. A problem in finding an equilibrium threshold is the radio environment, with noise and interference, change and then also the radio false detections or missed detections change. According to the present invention some access signals can be identified as being not assigned and therefore not being in use, and any detection of a non-used signal is identified as a false detection. By monitoring the ratio of false detections vs. correct detections the threshold level for detection is tuned into an equilibrium level, and that is adapted to the changing radio environments. In addition the detection threshold level for access signals detection threshold for data and/or control signalling may be adjusted in relation to the access signal threshold level.

14 Claims, 7 Drawing Sheets

(56) References Cited

U.S. PATENT DOCUMENTS

| | | | |
|---|---|---|---|
| 2005/0190786 A1* | 9/2005 | Jones et al. | 370/465 |
| 2007/0105557 A1* | 5/2007 | Israelsson et al. | 455/436 |
| 2007/0165567 A1* | 7/2007 | Tan et al. | 370/329 |
| 2008/0101306 A1* | 5/2008 | Bertrand et al. | 370/336 |
| 2008/0310322 A1* | 12/2008 | Tidestav | 370/253 |
| 2010/0309877 A1* | 12/2010 | Damnjanovic et al. | 370/331 |

OTHER PUBLICATIONS

3GPP TSG RAN WG1#49bis, R1-073058, "Contention and Dedicated RACH Signature Allocation", LG Electronics Inc., Orlando, US, Jun. 25-29, 2007.

Extended EP Search Report mailed Jan. 31, 2014 in EP Patent Application 08712829.4.

* cited by examiner

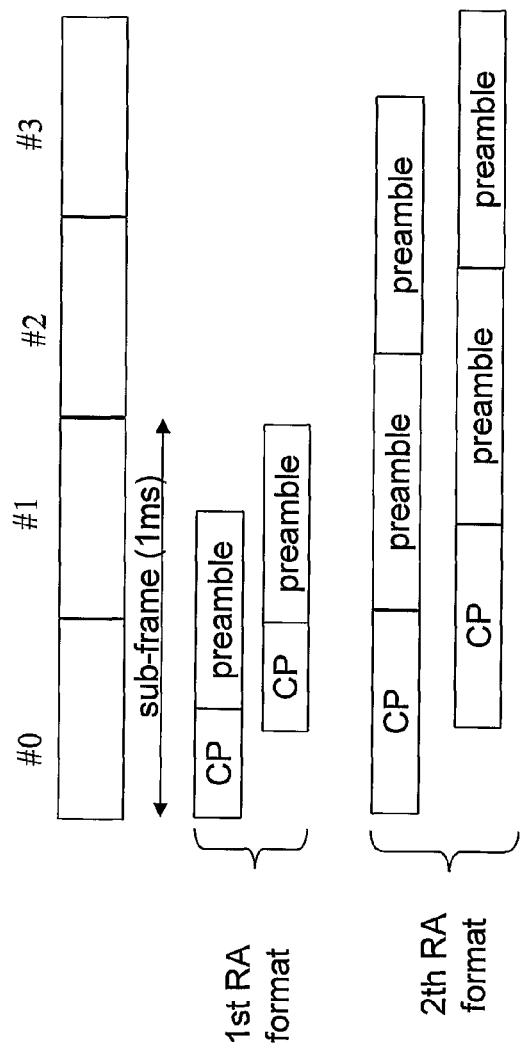
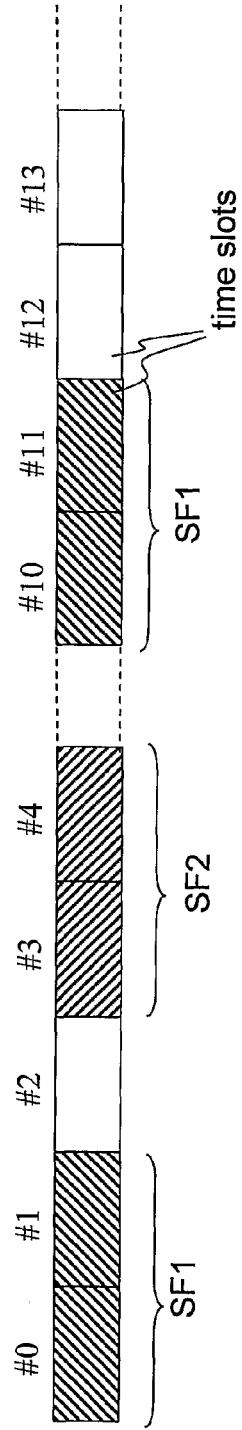
Fig. 4b
Fig. 4c

US 8,717,907 B2

ADJUSTMENT OF RADIO DETECTION LEVEL FOR REQUEST SIGNALS BASED OBSERVED FALSE DETECTION

This application is the U.S. national phase of International Application No. PCT/SE2008/050201 filed 21 Feb. 2008 which designated the U.S., the entire contents of which is hereby incorporated by reference.

TECHNICAL FIELD OF THE INVENTION

The present invention relates to radio communication and in particular to a radio base station, an O&M node and a method for determining a threshold level for detecting access signals as received.

BACKGROUND

3GPP LTE (Long Term Evolution), usually referred to just as "LTE", is a cellular radio access communication technology for packet switched services. A cell is defined by a set of resources for supporting terminals with communication. A radio base station (RBS) provides the physical entities for the cell resources. FIG. 1a illustrates a cellular system 100, for simplicity only one cell, 130, one RBS, 110, and one terminal 120 is shown, while in practice a cellular system comprises a plurality of RBS each supporting one or more cells, and there typically are a number of terminals in each cell. The presence of a radio channel 140 between the terminal 120 and the RBS 110 is also indicated in FIG. 1a. A cell is often described as serving terminals within a physical area, albeit, the service areas of different cells may fully or partly coincide with each other. In LTE the terminal is named UE (User Equipment) and the RBS eNodeB. In the further description the terminal is named UE, while the general acronym RBS is maintained.

In radio communication, and especially in cellular communication, noise and interference from non-desired signals are added to the received power of a desired signal. The desired signal may be detected when the received power of it exceeds that of noise and interference with a minimum level. Most transmissions from UEs are scheduled and therefore the RBS knows many details on when and how to best receive it. However, some UL (UpLink) radio channels are non-scheduled and the RBS has no expections when the UEs may transmit on the channel. Typically these types of channels are used by the UEs to transmit an access signal to request access to transmission resources. The uncertainty in timing, if any reception will be made at all, in combination with no error correction coding being available makes it difficult for the RBS to detect the access signals. The RACH (Random Access CHannel) is one example on these types of channels, and the problems will be more elaborated with the RACH as example, albeit the further problem description is also relevant for other channels that carry access signals.

The RACH is a non-scheduled channel used by a UE to communicate in the UL with the RBS. The RBS is typically not aware of if/when a UE will need to access the network, in particular for initial access, when the UE makes a first contact with the network, and when it has UL data to transmit after a period of non-transmission. The UE will transmit an access signal, here named random access preamble, as it wants to access the network.

The power control of the RACH in radio systems, i.e. the ability to control that the received power level for the RACH preamble is sufficiently high has always been a crucial part of radio network control. It is essential that also UEs on the cell edge can access the network. In case the threshold in the RBS for detecting an access signal is set too high, the cell range shrinks.

With the RACH type of channel, it is always a trade-off between missed detections and false alarms, which is illustrated in FIG. 1b. A missed detection on the RACH means that the RBS does not detect a random access preamble transmitted by a UE. If the UE has the capacity to increase the power it retransmits the random access preamble at higher power until a response is received. In such a way, access may eventually be achieved but at the expense of delay. A false alarm on the RACH means that the RBS incorrectly detects a random access preamble when none has been transmitted, e.g. due to a high noise and possibly interference peak. There is in other words a trade-off between service coverage and access delay on the one hand and false alarm load and resource consumption on the other.

In order to separate random access preambles which have actually been transmitted by real UEs from those falsely detected from noise and interference, a threshold parameter is needed. Typically, the threshold should be set such that a desired false alarm ratio is achieved.

It is normally a tedious work to designate the values of such a threshold parameter, since the noise and interference changes continuously over time and area and with that the required signal to interference plus noise ratio (SINR). A too high threshold as compared to the actually required SINR implies the number of access attempts made before the UEs succeed in getting access to the network will increase, and this in turn generate further interference. Hence, traffic can not be handled in the swift pace that would be desired. A too low value, on the other hand, implies a sensitive receiver that wastes its limited resources to serve noise rather than serving true traffic. Again, traffic can not be handled in the swift pace that would be desired.

Even though generally the RBS has no advance-knowledge of if, or when a UE will need to access the network there are some situations where the use of the random access channel can be foreseen. For situations when the RBS knows in advance when UEs will use the random access channel, e.g. at incoming handover, the RBS can assign dedicated random access preambles for explicit use by such individual UE. The random access procedure that applies with an assigned random access preamble is here referred to as contention free random access (CFRA), also called non-contention based random access, while contention based random access (CBRA) is used for the former where the UE randomly selects one preamble from a set of preambles allocated for CBRA.

The inevitable result of a system that uses both of these random access schemes, e.g. one that supports both public CBRA and designated CFRA, is that the random access preambles must be pre-partitioned in two groups: one group broadly announced to the UEs as being available for random selection in case a UE on its own initiative accesses the network and a second group consisting of those used to temporarily assign individual preambles as the CFRA users occur, see FIG. 5. The second group need typically not be broadly announced.

Problems with Existing Solutions on the RACH

There is an ever-changing trade-off between false alarm and missed detection. The existing methods to determine the best value of a threshold parameter are very much methods that involve trial and error.

The problems with existing solutions are:
1. Lack of Observability; A missed detection can not be observed since by definition it leaves no trace and there is no evidence it did occur. A false detection can not be observed in that way it can not easily be distinguished from a detection of a true access whenever such occurs on a channel that does not allow the completion of the random access procedure.
2. Coarse and uncertain estimations; There is no secure method to select as threshold value one equilibrium matching that specific SINR of detection which minimizes false detections as well as missed detections. Rather the methods are typically based on trial and error. Often a value that implies a substantial amount of false detections must be selected to achieve, if not optimal, so at least acceptable service coverage.
3. Direct impacts on live traffic; As can be seen in FIG. 1b, increasing the threshold used to detect real accesses will immediately increase the amount of missed detections. Missed detections imply longer delays and increased call setup times. Decreasing the threshold will directly increase the amount of false alarm detections.
4. Tedious and ever-changing; The noise and interference changes over time and area. It is a hard if not an impossible quest to find the thresholds of equilibrium that maximizes served traffic in different parts of the radio access network.

SUMMARY OF THE INVENTION

The present invention addresses the problem of finding and setting a detection threshold level that makes a good balance between false detections and lost detections in an environment with varying radio conditions.

The solution to the problem is based on the insight that one or more access signal resources in a group of possible access signals resources in some situations is/are guaranteed to not carry a true access signal in one or more time slots on the radio channel. Detection of an access signal on an access signal resource in a time slot when the access signal resource cannot carry an access signal is therefore known to be a false detection. The detection threshold in the receiver is then adjusted to meet target ratio of false detections.

The invention includes a method that comprises the steps of:
Identifying a plurality of time slots when one or more of the access signal resources cannot be utilized for carrying an access signal. A detection of an access signal on an access signal resource in a time slot, when the access signal resource cannot be utilized is also identified as being a false detection.
Adjusting the threshold level for detection of access signals such that the ratio of false detections will adapt to a predefined level.

The invention also relates to a radio base station adapted for performing the method, and to an Operation and Maintenance node that is arranged for performing some of the steps of the inventive method.

An advantage with the present invention is that it enables tuning of a detection threshold level until a fair/desired balance between missed detections and false detections of access signals is achieved.

A further advantage with the present invention is that the threshold level may be continuously and autonomously adjusted in the RBS to maintain the balance when the conditions in radio environment change.

A further advantage provided by embodiments of the present invention is while the threshold level is being tuned, the detection of access signal/s which is the result of actual traffic can continue without being negatively affected by the tuning.

DESCRIPTION OF THE DRAWINGS

FIG. 4b is diagram illustrating time slots on an LTE frequency carrier and random access request formats.
FIG. 4c is diagram illustrating time slots on an LTE frequency carrier.

DESCRIPTION OF PREFERRED EMBODIMENTS

Figure 1A:
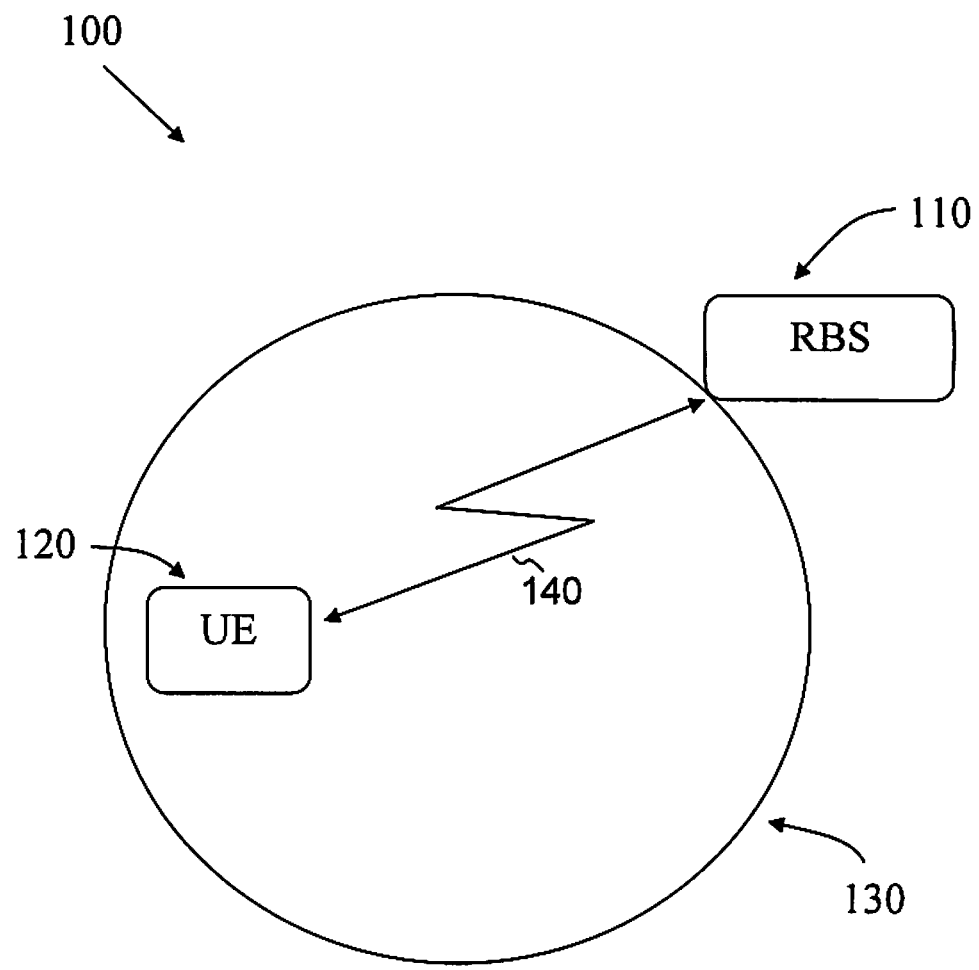
FIG. 1a is a view illustrating a cellular system.
Figure 1B:
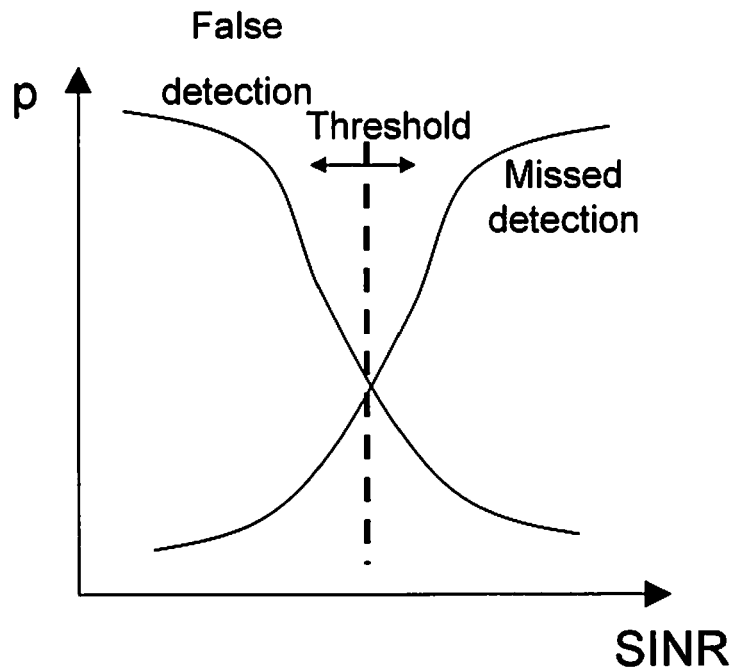
FIG. 1b is a graph illustrating the probabilities of false alarm and of missed detection vs. SINR.
Figure 2:
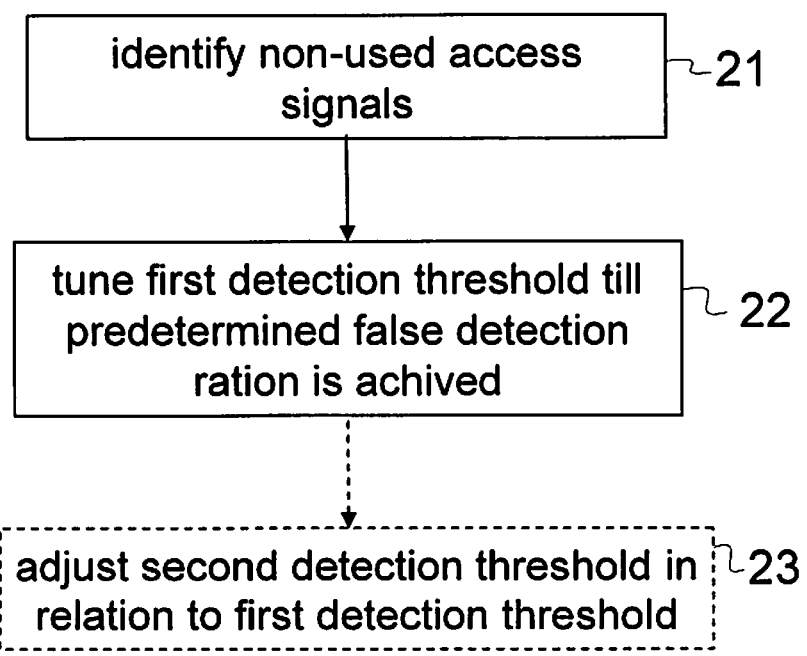
FIG. 2 is a flowchart of the steps of an inventive method.

FIG. 2 is a flow chart of the steps of the invention. In a first step 21 time slots are identified in which one or more of a plurality of access signal resources is/are unavailable to UEs and cannot be used by a UE for accessing the network. The identification is based on at least some of the access signal resources are possible to assign to UEs for use in defined time slots. Assignable access signal resources that are not assigned to any UE for one or more time slots cannot be used by any UE during those time slots. If an access signal is received on an access signal resource in a time slot when it is non-assigned, its detection is identified as being false.

In the following step, 22, an access signal detection threshold level is adjusted, such that the ratio of false detections converges to a desired target ratio. The ratio of false detection is calculated as the number of identified false detections versus the number of potential false detections. Any unavailable access signal resource in a time slot is a potential false detection. The longer time period false alarms are detected the higher number of time slots for potential false detections and the better confidence in the false alarm ratio.

The same threshold level for detecting all access signals can be applied irrespective of if the access signal detection is false or correct, and continuously adjusted until the target ratio of false detections is obtained in step 22. Alternatively, the detection level for access signals other than the identified false detections is tuned in a separate step 23, and not until the target level of false alarm ratio is reached by the tuning in step 22, the detection threshold level for correct detections is adjusted in step 23.

There are at least two types of access signal resources:
a preamble, for use by the UE when accessing the network via a RACH (Random Access CHannel) during a random access process, and a scheduling request resource, for use by the UE when accessing the network via a PUCCH (Packet Uplink Control CHannel) during a scheduling request procedure The identification of unavailable access signal resources will be described further down for the respective access procedure.

The problems as described above in the prior art sections, are solved by the following merits of the invention:

1. Enable Observability: By identifying, 21, time slots and access signals resources that are not assigned in the time slots, false detections can be observed since a detection of an access signal carried on a non-assigned access signal resource can not be misinterpreted as detections of true accesses.
2. Matched and certain estimations: Based on a number of identified false detections a SINK, detection level is tuned, 22, into equilibrium level that keeps the ratio of false detections at a predefined level.
3. Minimal or no impact on live traffic: While the RBS serves UEs with communication, the detection threshold level for false detections can be tuned in a radio base station, with no impact on the traffic served. The detection level threshold for correct detections may be tuned after the threshold level for false detections has reached its equilibrium value, and thereby the risk of temporary receiving a high number of false detections or missing detections is eliminated.
4. Adaptive to ever-changing radio conditions: The present invention enables the access signal threshold to be adjusted, if and when radio conditions, such as noise and interference levels, change. The invention allows for the detection threshold level being adaptively and autonomously adjusted, with the constraint to keep the ratio of false detections at the predefined level.

Physical Channels in the LTE

Figure 4A:
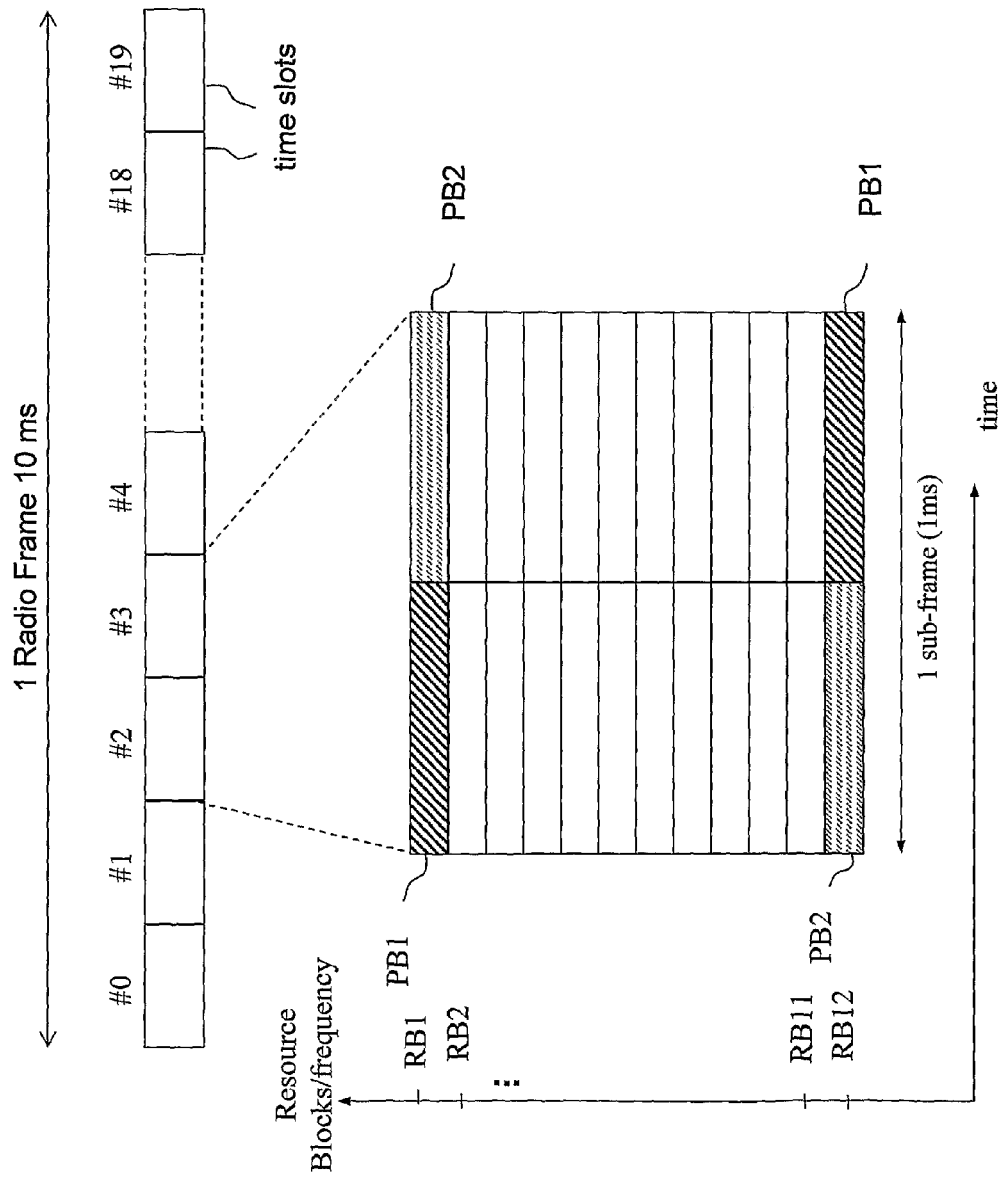
FIG. 4a is diagram illustrating a physical structure of an LTE frequency carrier.

FIG. 4a illustrates the physical channel structure in the LTE uplink. A frequency carrier is divided in the time domain into subsequent radio frames, one of them illustrated in top of FIG. 4a. Each radio frame is divided into time slots that are paired into sub-frames. Lower part of FIG. 4a illustrates the two time slots of a sub-frame are subdivided in the frequency domain into a plurality of physical resource blocks. In the example of FIG. 4a, there are 12 resource blocks on the frequency carrier, other numbers are possible depending on the bandwidth of the frequency carrier. In FIG. 4a only the resource blocks of two of the time slots are illustrated, though it should be understood all time slots on a frequency carrier comprises the same number of physical resource blocks.

The Physical Uplink Control Channel (PUCCH) is allocated to one physical resource block, e.g. PB1, positioned at the edge of the frequency carrier, and the position alternates to be at the upper or lower edge between subsequent time slots. The PUCCH is used for signaling of HARQ ACK/NACK reports, channel quality information feedback and scheduling request. PUCCH from different users can be code-multiplexed onto the same physical resources block. The PUCCH capacity may be increased by at least a second physical resource block PB2 being allocated in each of the time slots. If two resource blocks PB1, PB2 they alternate their position in frequency domain between subsequent time slots.

Similarly to the PUCCH the RACH is assigned resource blocks in predefined time slots. There are plural alternative schedules of assignment, and the selected assignment is broadcasted as system information. In LTE the RACH is assigned to at least one sub-frame of two subsequent time slots. There are plural alternative formats for the random access signal, two of which are illustrated in FIG. 4b. In a first format the random access signal format comprises a cyclic prefix CP followed by preamble. The length of the first format is shorter than the sub-frame of 1 ms, to give room for a guard period that compensates for variations in the propagation delay owing to if the random access signal is sent from a UE on the cell border or from a UE in the vicinity of the radio base station. FIG. 4b discloses two copies of the first format to illustrate the variations at arrival timing at the RBS, and the need for guard time. As an example of the various random access signal formats second random access signal format is illustrated in two copies in lower part of FIG. 4b. The second format comprises a cyclic prefix and a random access preamble repeated twice and requires two subsequent sub-frames to accommodate its length. The type of random access signal that shall be used in a cell 130 is predefined and broadcasted as system information.

Random Access Procedure in LTE

Figures 3A, 3B:
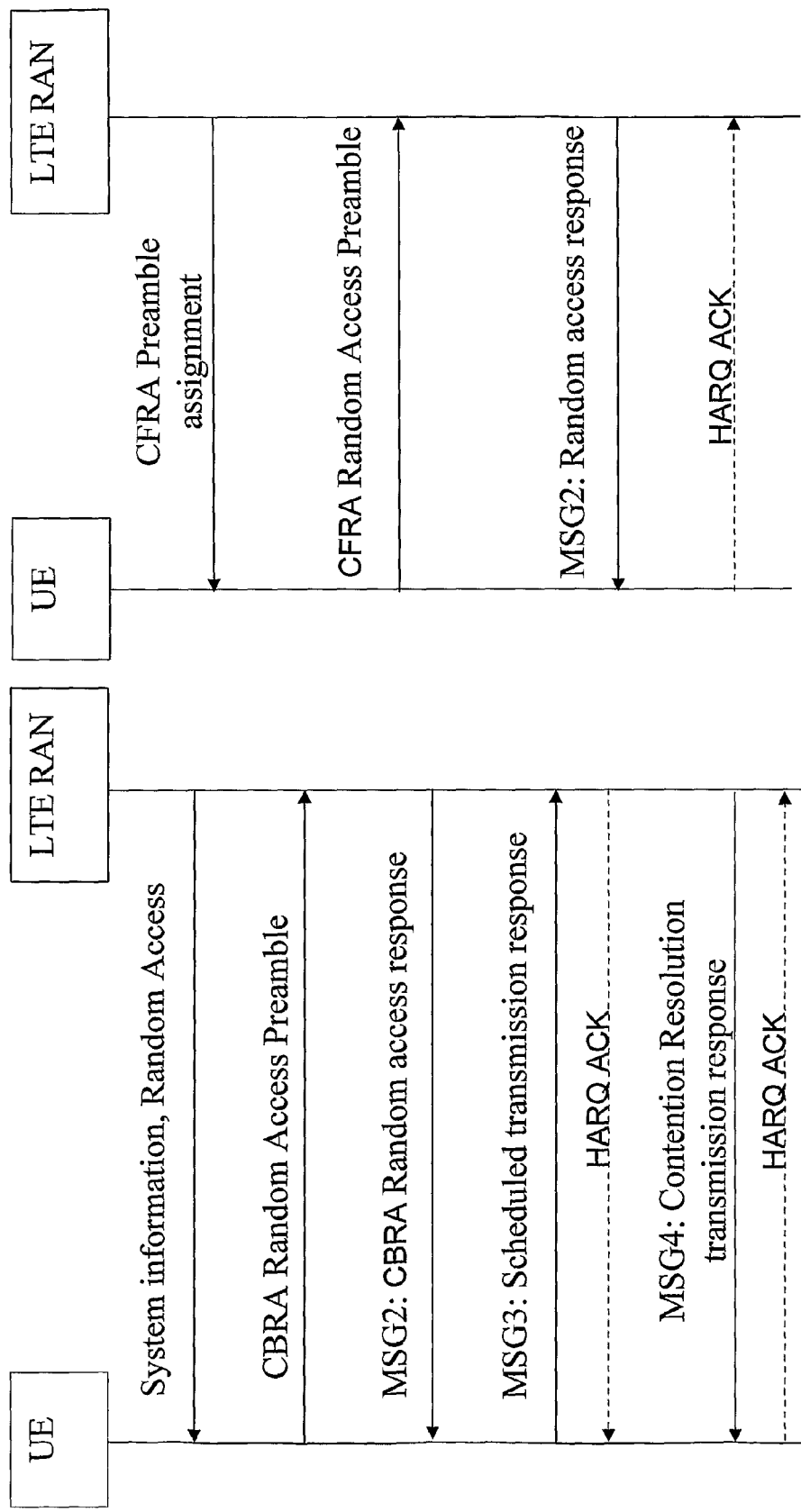
FIG. 3a is a signalling chart illustrating the messages exchanged between a UE and LTE RAN in relation to a contention based random access procedure.
FIG. 3b is signalling chart illustrating the messages exchanged between a UE and LTE RAN in relation to a contention free random access procedure.

The messages exchanged between UE and RBS during the CBRA procedure for the LTE are shown in FIG. 3a. Before initiation of the CBRA procedure, the UE has received the system information of the cell. The UE starts the random access procedure by randomly selecting one of the preambles available for CBRA. The UE then transmits the selected random access preamble on the physical random access channel (PRACH) to the RBS. The RBS acknowledges any preamble it detects by transmitting a random access response, as is disclosed by MSG2 in FIG. 3a. The random access response includes an initial grant to be used on the uplink shared channel, a temporary C-RNTI and a time alignment update. When receiving the response the UE uses the grant to transmit a message, see MSG3, that is used to uniquely identify the UE on the common channels of the cell, and for the initial access case, also is used to trigger the establishment of radio resource control. Since multiple UEs may transmit the same preamble at the same time, the procedure ends with the RBS solving any preamble contention that may have occurred. The ending contention resolution message, see MSG4, includes the UE identity of the single UE that is granted access to the network in the random access procedure.

The messages exchanged between UE and RBS during the CFRA procedure for the LTE are shown in FIG. 3b. In this procedure, the RBS assigns a dedicated preamble to a UE and that is available for that UE during the period it is assigned. The UE transmits the assigned dedicated preamble on the PRACH to the RBS. The RBS detects that it has received a preamble that was dedicated to a specific UE and is therefore able to identify the UE already at this stage, as opposed to the CBRA procedure where the RBS can identify the UE first after receiving MSG3. The RBS then acknowledges that it has received the preamble by transmitting the CFRA random access response message, see MSG2 in FIG. 3b, to the UE, and that ends the procedure.

Access Signal Resources for the Random Access Procedure and Identification of Unavailable Access Signal Resources For random access, the access signal resources are the random access preambles available in a random access channel, where each preamble is an access signal resource.

Figure 5:
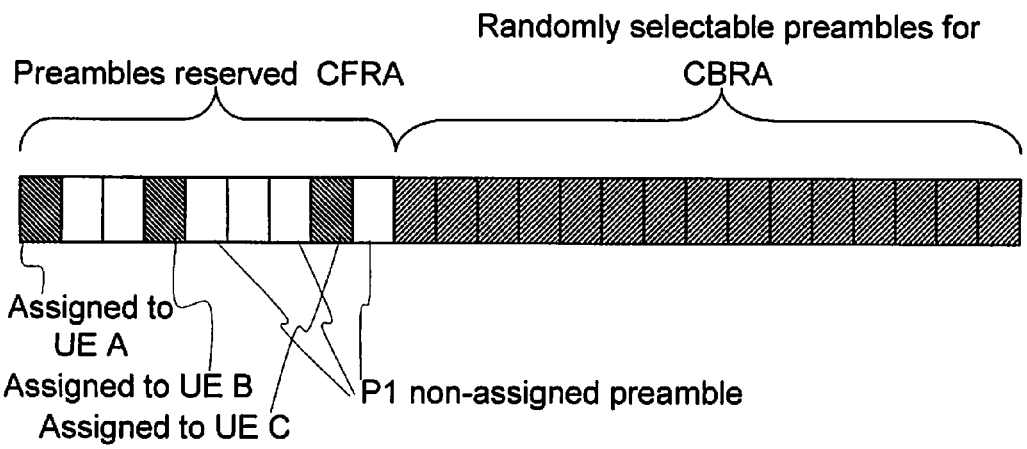
FIG. 5 is a scheme illustrating the total group preambles for random access, and its partitioning into separate groups and use.

The RBS that serves both these RA schemes, i.e. one that supports both public CBRA and designated CFRA, must inevitably pre-partition the preambles in two groups. FIG. 5 illustrates the total group of preambles for the random access procedure partitioned into a group from which a UE 120 randomly selects a preamble when performing a CBRA, and another group of preambles any of which is to be assigned to a UE when performing a CFRA. The RBS 110 assigns CFRA preamble to UEs, 120, within the cell 130. The sub-group of preambles for CBRA is either fixed, according to a standard specification, or semi-statically broadcasted in the coverage area of the cell. When the RBS assigns a CFRA preamble to a UE the UE is informed over dedicated and secure connection.

During the times when CFRA users either do not occur at all, e.g. if the support for CFRA is switched OFF in the RBS, or whenever the occurrence of users does not require the full CFRA group of preambles, one or more of the preambles in the group of CFRA preambles will not be assigned to any UE. The non-assigned preambles, P1, in FIG. 5 are illustrated by the non-hatched squares, P1. The non-assigned CFRA preambles, P1, are unavailable to the UEs in the cell and known a priori not to carry a valid random access request from any UE. Any detection of a unavailable CFRA preamble will therefore always and inevitably be a false alarm. There will be no missed detection of such a preamble since it is known in advance not to be used.

A CFRA preamble will be assigned to a UE for a time duration which is necessary to complete the procedure for which CFRA preamble is needed. The assigned CFRA preamble is then returned to the group of non-assigned CFRA preambles. The CFRA process is included LTE standard and that implies the RBS keep control of which of the CFRA preambles that are currently allocated and which are free.

Unavailable preambles to be used for determining false detections are;
- The CFRA preambles, P1, that are not designated to any UE within a cell, 130, are used for finding false detections within that cell.
- Optionally, the set of preambles for finding false detections is restricted by neither being used in the own cell nor in a neighbor cell.
- Optionally a preamble is allocated only for the special purpose of identifying false detections. The special purpose preamble will not be assigned to any UE. An advantage is it can be used in a wide range of cells and a false detection in one of the cells of the special purpose preamble will not be caused by a UE in the cell border sending it with intention to be received in a neighboring cell.

Scheduling Request Procedure

A UE in active mode that has something to send in the UL request the right to transmit data on the shared data channel via a scheduling request message on the PUCCH (Physical Uplink Control Channel). The scheduling request is a request for access to the UL shared data channel and is as such an access signal just as the random access preamble. The UE only transmits a scheduling request on the allocated resource when it has data to transmit in UL, i.e. when it wants to request a scheduling grant from the RBS. When the UE does not have a need to request a scheduling grant, no scheduling request signal is sent on its assigned scheduling request resource.

Scheduling Request Access Signal Resource

A scheduling request resource on PUCCH is defined by a specific code and specific physical resource blocks in a specific sub-frame on the LTE frequency carrier. The UE may be assigned either or both of the first physical resource block PB1, and the second physical recourse block PB2, within the two time slots of the sub-frame. Plural UEs may be assigned the same physical resource blocks, PB1, PB2, albeit with different codes. The same code may be assigned to two UEs on separate physical resource blocks PB1, PB2 within the same time slot. A scheduling request resource dedicated to a UE will typically be periodically recurring, for example in the first physical resource block, PB1, in a sub-frame recurring with a 5 ms period. FIG. 4c illustrates a series of time slots that are grouped into sub-frames, a first scheduling resource in first sub-frame, SF1, that is recurring with 5 ms period is assigned to a first UE. The first scheduling resource is also assigned to a second UE albeit in a second sub-frame, SF2, that is also recurring. The first and second sub-frames, SF1, SF2, do not coincide.

The LTE RBS possesses information on which scheduling request resources that are available on PUCCH in each sub-frame, and which of these that have been assigned to a UE and which that are non-assigned, i.e. which scheduling request resources that are unavailable to the UEs and cannot carry a scheduling request. Scheduling requests detected on a non-used scheduling request resource on the PUCCH, can thus be identified as false detections by the RBS and be used for tuning the detection level threshold for scheduling request on the PUCCH.

Detection Level Tuning Algorithm

Figure 6:
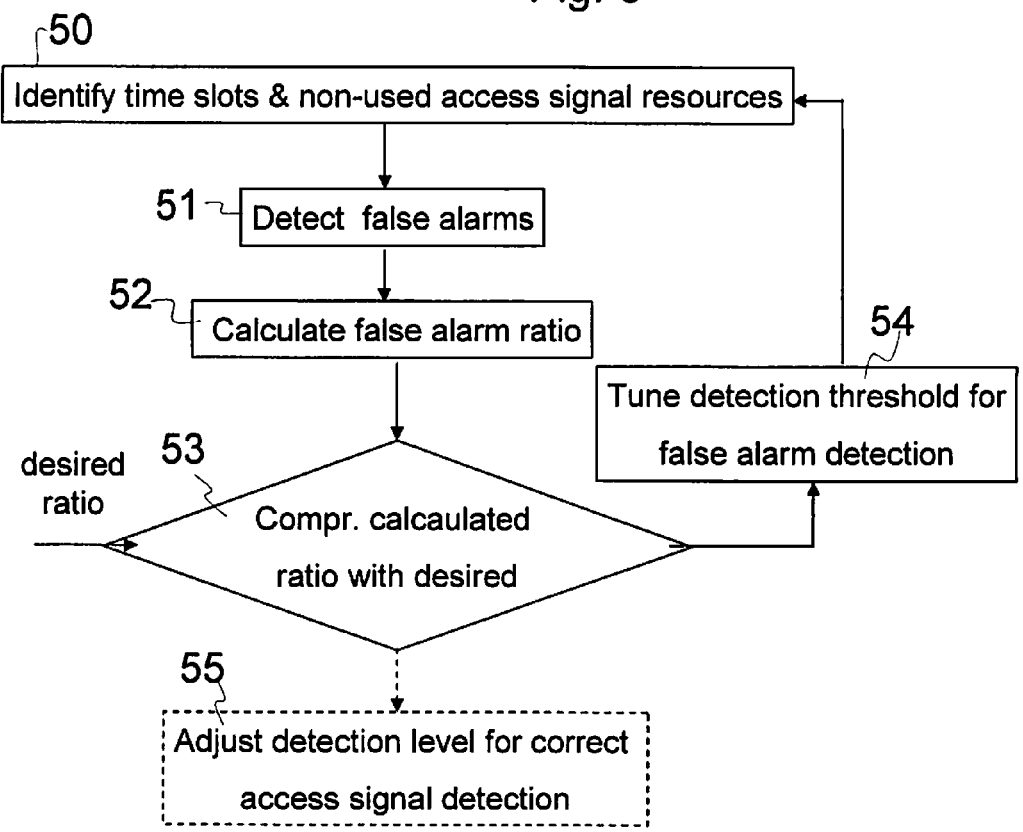
FIG. 6 is a flowchart of the steps of a detection threshold level tuning algorithm.

FIG. 6 is a flowchart disclosing the more detailed steps of tuning the detection threshold level for access signals. In an initial step 50, time slots with non-assigned signal resources and for each time slots the respective non-assigned signal resources are identified. In a following step 51, access signals carried on the unused access signal resources are detected and identified as being false alarms.

Next, 52, the false alarm probability is calculated as the number of detections divided by the total number of potential false detections. In following step, 53, the calculated ratio of false detections is compared to a desired ratio. If the difference between calculated and desired ratios exceeds a predefined range, the threshold level for detection of false alarms is adjusted in step 54. If, alternatively, the difference between the detected and desired ratios is within the predefined range, the detection threshold level for correct detections is adjusted to the same value as was set for the incorrect detections, in step 55.

Note that it should be understood that step 50 and step 51 can be done in a different order, i.e. the access signals could be detected on all access signal resources and thereafter which of these that are unused could be determined. It should also be understood that step 53 could contain filtering and/or averaging of the measured false alarm probability over a number of access signal detections.

It is possible to apply the same detection level for false and correct detection of access signals, and tune it in step 54. If so step 55 is superfluous. Tuning the thresholds of false and correct detection separately is preferred, because during the tuning process, it is possible that the threshold levels could become too high or too low, and applying the same settings to the detection of real access signals could therefore temporarily degrade performance of the real access signals. Moreover, different threshold settings may be applied to CFRA and CBRA preambles, since for assigned CFRA preambles it is highly probable the CFRA preamble will occur. By using different threshold settings it may be difficult to tune both thresholds simultaneously.

The desired false alarm ratio is expected be selected within a span of 10%-0.001%.

The ratio of false detections may alternatively be calculated as the ratio between the number false detections versus the number of correct access signal detections.

Monitoring Assignments and Releases of Access Signal Resources

The assignment and release of dedicated access signal resources shall be continuously monitored. In case of random access preambles, their CFRA assignments may be updated within intervals expected to be about 1 ms, depending on how frequent handovers are into the cell. With respect to scheduling request, the unused scheduling request resources are expected to vary from sub-frame to sub-frame since scheduling request resources in subsequent sub-frames will rarely be assigned to the same UE.

Physical Implementation in RBS and Optionally in O&M

The tuning process as disclosed by FIG. 5 is performed by the RBS. Alternatively, an O&M server in a separate node outside the RBS performs the comparison, and controls the tuning of the detection threshold values, see steps 53-55. In both alternatives, the RBS performs the detection, identifies the false detections and calculates the false alarm ratio, i.e. the actions of steps 51 and 52.

Figure 7:
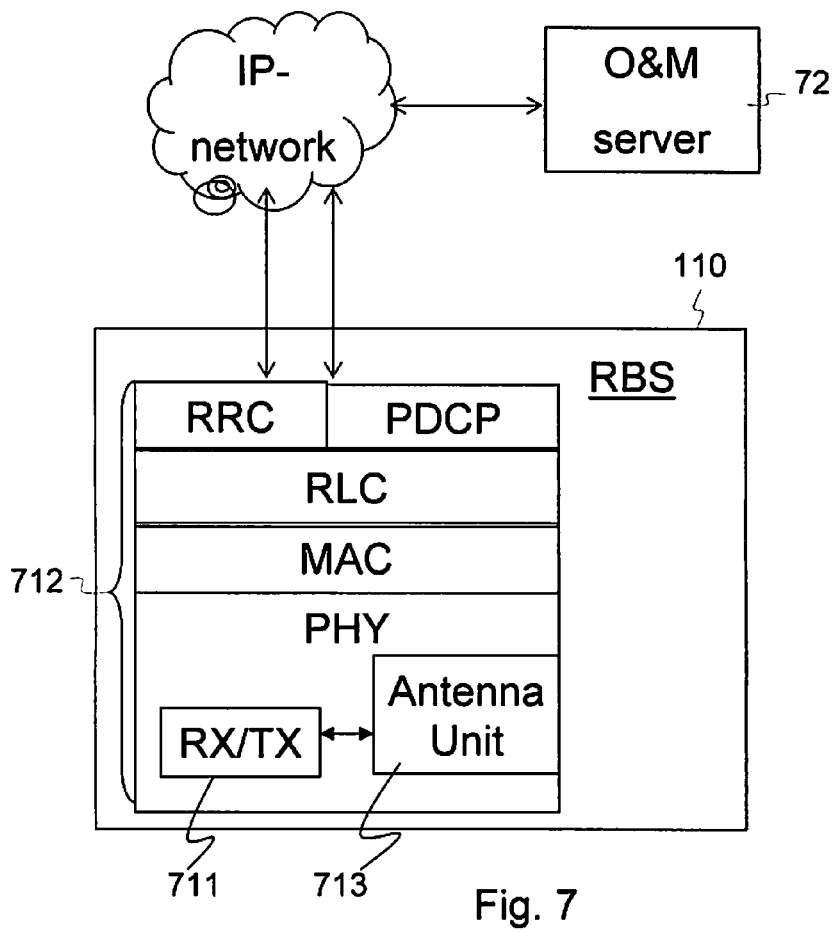
FIG. 7 is a block diagram of an inventive RBS.

FIG. 7 discloses a RBS, 110, adapted for performing the inventive method. The functions of the RBS is organized according a protocol stack, 712, comprising from bottom to top, a physical layer, a MAC layer, a RLC layer and a RRC layer in parallel with a PDCP layer. The protocol layers are mainly implemented in software run on data processors, with the physical layer as an exception. For that reason the physical components transceiver, 711, and antenna unit, 713, are indicated within the physical layer, albeit, the protocol stack, 712, model traditionally indicates functions provided without the physical means required for the implementation.

The MAC layer keeps control of the assignments of CFRA preambles, and of assignments of scheduling request resources on PUCCH. When a new assignment is made the MAC informs the physical layer and when it cease also the physical layer is informed. It is also possible to implement these functions outside the MAC layer.

Detection of signals and data are performed by the physical layer and a counter for respectively false and potential false detections is introduced, preferably in software, let be alternative in hardware is feasible. The physical layer performs detections of access signals. The detection threshold level/s on the physical layers is arranged for being adjustable. The physical layer is updated with information on assigned access signal resources and released assignments for the PRACH and for the respective PUCCH. The physical layer also has information on the total group of assignable preambles and set of scheduling request resources in each sub-frame. A detected assignable preamble that is not assigned is identified as being a false detection by the physical layer. In case of the RBS, 110, itself is arranged for comparing of the ratio of false detections and for controlling the tuning levels, these functions are implemented in the physical layer software of the RBS, 110.

If alternatively, the comparing and adjusting steps, 53-55, are controlled by an O&M system, the RBS sends the measured figures on correct and false detections to the O&M server, 72, for example via an interface to an IP network that conveys the information. The O&M server, 72, responds with information on one or more detection threshold levels. O&M servers controlling parameter settings in the RBS could be commonly known and standardised within 3GPP, but typically these will be proprietary. An inventive O&M server, 72, is implemented with software for determining detection threshold values based on reports from the RBS on figures of correct and false access signal detections.

Detection of an Access Signal

Figure 8:
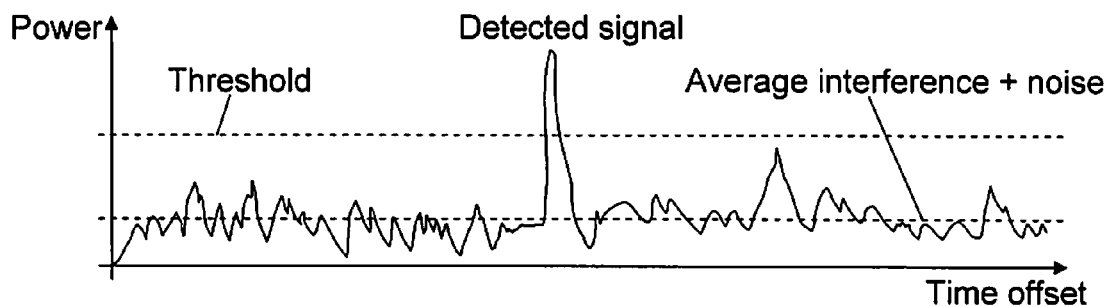
FIG. 8 is a graph of received power over time.

The detection of an access signal can for example be based on that the detected signal power should exceed the estimated noise and/or interference power by a specific factor. FIG. 8 is a graph example of how the received power varies over time and threshold levels for detection. The minimum factor that the detected signal power should exceed is given by the threshold value. In case of a random access preamble, the timing of the preamble is also unknown which means that the preamble detection algorithm needs to evaluate a number of different time offsets. The detection threshold could be based on the estimated average noise and/or interference, but could also be based on the variance of the noise and/or interference. For example: If the variance of the noise and/or interference is large, a larger threshold value may be required compared to if the variance would be smaller.

Miscellaneous

It should be understood that also more false detections than those identified and used for tuning the detection threshold level occur during access signal detection. The purpose of the tuning a setting of the detection threshold level is to find a balance between missed detections of true access signal on one hand and an on the other the number of false detections that cannot immediately be identified as false.

In cellular communication systems the access signal resources are assigned and radio channels provided per cell. Accordingly the methods as described should be understood to be performed per cell when the invention is applied in a cellular communications system. For implementation in any future systems also non-cellular communication systems should be considered. The invention is here described in the context of LTE but it is straight forward to generalize the description also to GSM, WCDMA, cdma2000, WiMAX or to any present or future radio communication system that controls assignment to UEs of at least some of available access signal resource and that can monitor unused access signal resources and thereby can assess a priori that any detected access signal carried by a unavailable signal resource is a false detection. In principle, the embodiment on the random access signal could be applied within the current WCDMA standard.

ABBREVIATIONS AND ACRONYMS

| | |
|---|---|
| CBRA | Contention Based Random Access procedure |
| CFRA | Contention Free Random Access procedure |
| DL | Down Link, i.e. transmission direction from network to UE |
| MAC | Medium Access Control |
| O&M | Operation & Maintenance |
| PDCP | Packet Data Convergence Protocol |
| PRACH | Physical Random Access Channel |
| RACH | Random Access Channel |
| RBS | Radio Base Station, in LTE the RBS is officially named eNodeB |
| RLC | Radio Link Control |
| RRC | Radio Resource Control |
| SINR | Signal to Interference and Noise Ratio |
| UL | Up Link, i.e. transmission direction from UE to network |
| LTE RAN | LTE Radio Access Network |

The invention claimed is:

1. A method related to receiving access signals from terminals over a radio channel that is divided into time slots, and wherein the access signals are transmitted on predefined access signal resources, the method comprising:

assigning one or more access signal resources among plural access signal resources to terminals, at least some of the access signal resources being assignable to terminals for use in one or more time slots;

keeping a record on non-assigned access signal resources and respective time slots of the non-assignment;

identifying a plurality of time slots when one or more of said access signal resources comprising non-assigned access signal resources among the assignable access signal resources are unavailable for carrying an access signal, wherein a detection in any of said time slots of an access signal carried by an unavailable access signal resource is identified as being a false detection;

keeping count of a number of false detections and a number of non-assigned access signal resources, and adjusting a threshold level for detection of the access signals, such that a ratio of false detections adapt to a predefined level;

wherein the ratio of false detections is a number of identified false detections versus a number of potential false detections, or is said number of false detections versus a number of correct detections; and wherein the number of false detections and the number of potential false detections or number of correct detections are collected during the same period.

2. The method of claim 1 wherein the access signal resources are a group of access preambles comprising a subgroup of randomly selectable preambles and a subgroup of assignable preambles.

3. The method of claim 2 wherein the radio channel is a random access channel.

4. The method of claim 1 wherein the access signals are scheduling request signals.

5. The method of claim 4 wherein the access signal resource is a code and a resource block within a time slot.

6. The method of claim 5 wherein the access signal resource is assigned to a terminal for a periodically recurring time slot.

7. The method of claim 4, wherein the radio channel is a packet uplink control channel.

8. The method of claim 1 wherein the threshold level for detection is based on the signal power relative to the power of at least one of interference and noise.

9. The method of claim 1 wherein the method is performed for respective cell in a cellular communications network.

10. A radio base station comprising:

a radio receiver;

means for receiving access signals from a plurality of terminals over a radio channel;

means for assigning one or more access signal resources among plural access signal resources to terminals;

means for keeping a record on non-assigned access signal resources and respective time slots of the non-assignment;

means for identifying detections of access signals as being false detections if detected on one of said access signal resources that is not assigned in the respective time slot of detection;

means for keeping count of the number of false detections and the number of non-assigned access signal resources, and means for adjusting a threshold level for detection of the access signals, such that the ratio of false detections adapt to a predefined level; the adjusting means further being arranged to:

compare the ratio of false detections with a desired number of false detections; and adjust the detection threshold in relation to the result of the comparison; an interface for communication with an O&M server, and arranged to:

report the number of correct detections and the number of false detections to the O&M server;

receive an instruction on the level for the access signal detection threshold; and adjust the access signal detection threshold level according to the instruction.

11. An Operation and Maintenance node with an interface for communication with a radio base station, the node being adapted to:

receive from the radio base station information on a ratio of false access signal detections;

compare the ratio of false access signal detections with a desired ratio;

determine a detection threshold level for the false alarm with the aim of adjusting the ratio of false access signal detections to converge towards the desired ratio;

inform the radio base station of said determined detection threshold level;

wherein the ratio of false detections is a number of identified false detections versus a number of potential false detections, or is said number of false detections versus a number of correct detections; and wherein the number of false detections and the number of potential false detections or number of correct detections are collected during the same period.

12. The method according to claim 1, wherein the one or more access signal resources are contention-free random access signal resources.

13. The radio base station of claim 10, wherein the one or more access signal resources are contention-free random access signal resources.

14. The Operation and Maintenance node of claim 11, wherein the false access signal detections are based on detections of contention-free random access signal resources that are not assigned in a respective time slot of detection.

* * * * *